3,642,785
INDENYL-3-ALIPHATIC AMINES
Tsung-Ying Shen, Westfield, and Richard B. Greenwald, Fanwood, N.J., assignors to Merck & Co., Inc., Rahway, N.J.
No Drawing. Filed Aug. 11, 1969, Ser. No. 849,194
Int. Cl. C07c 103/19
U.S. Cl. 260—240 R                    2 Claims

ABSTRACT OF THE DISCLOSURE

New substituted 1-alkylidenylindenyl-3-aliphatic amines and non-toxic pharmaceutically acceptable acid addition salts and hydrates. The substituted aliphatic amines described herein are useful as anti-inflammatory compounds and bactericides.

This invention relates to new chemical compounds which are useful as bactericides and anti-inflammatory compounds. More particularly, it relates to new 3-indenyl aliphatic amines having an alkylidene group at the 1-position of the fused ring system. This invention also relates to the acid salts and hydrates of these novel amines and to processes for producing these compounds.

The new 1-alkylidene-3-indenyl aliphatic amines of this invention have the following general formula:

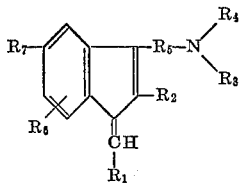

wherein:

$R_1$ may be aryl or heteroaryl;
$R_2$ may be hydrogen, halogen, hydroxy, loweralkyl, aryl, aralkyl, loweralkoxy, haloloweralkyl, loweralkylthio, arylthio or loweralkenyl;
$R_3$ may be hydrogen or loweralkyl;
$R_4$ may be acyl (such as acetyl, propionyl, butyryl, etc.) or tolylsulfonyl, or together with $R_3$ and the nitrogen to which they are attached, phthalimido;
$R_5$ is loweralkyl;
$R_6$ may be hydrogen, halogen, loweralkyl, loweralkoxy, alkylthio or trifluoromethyl; and
$R_7$ may be hydrogen, hydroxy, loweralkyl, loweralkoxy, nitro, amino, lower alkylamino, di(loweralkyl)amino, loweralkanoylamino, loweralkanoyl, cyano, trifluoromethyl, halogen, di(loweralkyl)sulfamyl, alkylsulfinyl, alkylsulfonyl, benzylthio, benzoyloxy, loweralkenyl or loweralkenyloxy.

In the preferred embodiment $R_1$ is a p-substituted phenyl radical, $R_2$ is loweralkyl such as methyl or ethyl, $R_3$ is hydrogen, $R_4$ is acetyl, toluenesulfonyl or together with $R_3$ and the nitrogen to which they are attached, phthalimido, $R_5$ is loweralkyl, $R_6$ is hydrogen, halogen or loweralkoxy and $R_7$ is loweralkyl, loweralkoxy, halogen or trifluoromethyl.

The following compounds are representative of those contemplated by this invention:

(1-p-chlorobenzylidene-2-methyl-5-methoxy-3-indenylethyl)-phthalimide;
N-(1-p-chlorobenzylidene-2-methyl-5-methoxy-3-indenylethyl)-acetamide;
N-(1-p-chlorobenzylidene-2-methyl-5-methoxy-3-indenylethyl)-p-toluenesulfonamide;
(1-p-chlorobenzylidene-2-methyl-5-methoxy-3-indenylpropyl)-phthalimide;
N-(1-p-chlorobenzylidene-2-methyl-5-methoxy-3-indenylpropyl)-acetamide;
N-(1-p-chlorobenzylidene-2-methyl-5-methoxy-3-indenylpropyl)-p-toluenesulfonamide;
(1-p-chlorobenzylidene-2-methyl-5-methoxy-3-indenylmethyl)-phthalimide;
N-(1-p-chlorobenzylidene-2-methyl-5-methoxy-3-indenylmethyl)acetamide;
N-(1-p-chlorobenzylidene-2-methyl-5-methoxy-3-indenylmethyl)-p-toluenesulfonamide;
1-(1-p-chlorobenzylidene-2-methyl-5-methoxy-3-indenyl)-2-propyl phthalimide;
N-(1-p-chlorobenzylidene-2-methyl-5-methoxy-3-indenyl)-2-propyl acetamide;
N-(1-p-chlorobenzylidene-2-methyl-5-methoxy-3-indenyl)-2-propyl-p-toluenesulfonamide;
(1-p-methylsulfinylbenzylidene-2-methyl-5,6-difluoro-3-indenylethyl)-phthalimide;
N-(1-p-methylsulfinylbenzylidene-2-methyl-5,6-difluoro-3-indenylethyl)-acetamide;
N-(1-p-methylsulfinylbenzylidene-2-methyl-5,6-difluoro-3-indenylethyl)-p-toluenesulfonamide;
(1-p-methylsulfinylbenzylidene-2-methyl-5-methoxy-3-indenylethyl)-acetamide;
(1-p-methylsulfinylbenzylidene-2-methyl-5-fluoro-3-indenylethyl)-acetamide;
(1-p-methylsulfinylbenzylidene-2-methyl-5-chloro-3-indenylethyl)-acetamide;
(1-p-methylsulfinylbenzylidene-2-methyl-5,7-difluoro-3-indenylethyl)-phthalimide; and
(1-p-methylsulfinylbenzylidene-2-methyl-5-methoxy-6-fluoro-3-indenylethyl)-p-toluenesulfonamide.

This invention also relates to a method of treating inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have antipyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterially administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc. Sterotix, stearic acid, magnesium stearate, terra alba, sucrose, agar, pectin, Cab-O-Sil, and acacia. Exemplary of liquid carriers are peanut oil, olive oil, sesame oil and water. Similarly, the carrier or diluent may include a time delay material such as glyceryl monostearate or glyceryl disterate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The compounds of the instant invention are also useful as bactericides and would be administered and used in the same manner and in the same dosage ranges as if they were being used to treat inflammation as described above.

In the preparation of the compounds of this invention, the starting material is a β-aryl propionic acid. This compound is prepared according to the procedure shown in flow sheet I which illustrates several alternative routes. Thus, a substituted benzaldehyde may be condensed with a substituted acetic ester in a Claisen reaction or with an α-halogenated propionic ester in a Reformatsky reaction. The resulting unsaturated ester is reduced and hydrolyzed to give the benzyl propionic acid starting material. Alternatively, a substituted malonic ester in a typical malonic ester synthesis and acid hydrolysis of the resulting substituted ester yields the benzyl propionic acid directly or the benzaldehyde may be reacted with propionic anhydride in a reducing medium to form the benzyl propionic acid.

EQUIVALENTS

X is halogen, usually Cl or Br
E is esterifying group, usually methyl, ethyl or benzyl
$R_2$ is hydrogen or alkyl
$R_6$ may be hydrogen, halogen, loweralkyl, loweralkoxy, alkylthio or trifluoromethyl, and
$R_7$ may be hydrogen, hydroxy, loweralkyl, loweralkoxy, nitro, amino, loweralkylamino, di(loweralkyl)amino, loweralkanoylamino, loweralkanoyl, cyano, trifluoromethyl, halogen, di(loweralkyl)sulfamyl, alkylsulfinyl, alkylsulfonyl, benzylthio, benzoyloxy, loweralkenyl or loweralkenyloxy.

REAGENTS (1) Zn dust in anhydrous inert solvents such as benzene and ether.
(2) $KHSO_4$ or p-toluene sulfonic acid.
(3) $NaOC_2H_5$ in anhydrous ethanol at room temperature.
(4) $H_2$, palladium on charcial, 40 p.s.i., room temperature.
(5) NaOH in aqueous alcohol at 20–100°.
(6) $NaOC_2H_5$ or any other strong base such as NaH or K-t-butoxide.
(7) Acid.

(I). Preparation of β-arylpropionic acid.

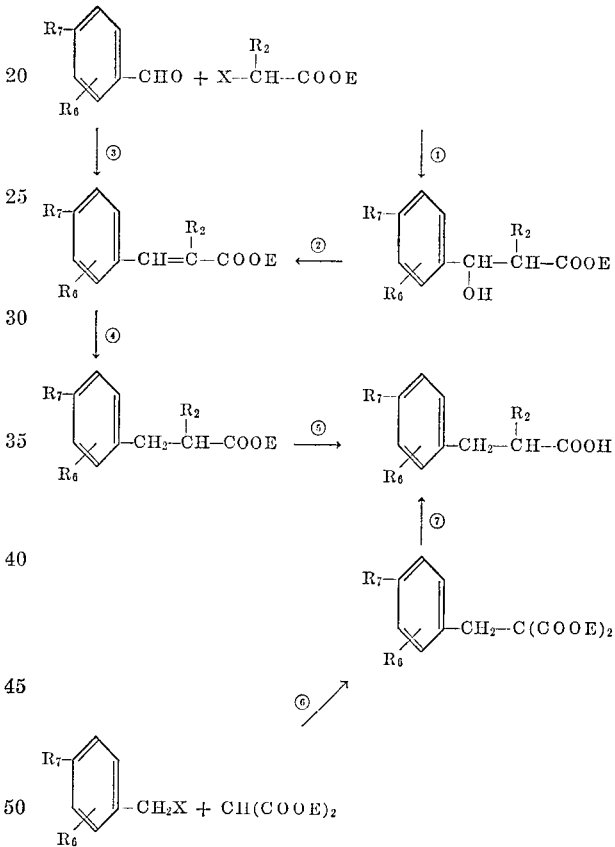

In the preparation of the compounds used in this invention again several routes are possible as shown in flow sheet II. The first step is the ring closure of the β-aryl propionic acid to form an indanone which may be carried out by a Friedel-Crafts Reaction using a Lewis acid catalyst or by heating with polyphosphoric acid. The indanone may be condensed with an α-halo ester in the Reformatsky Reaction to introduce the aliphatic acid side chain by replacing the carboxyl group. If the Reformatsky Reaction route is used, the intermediate 3-hydroxy-3-aliphatic acid derivative must be dehydrated to the indene. The ester may be hydrolyzed to give the free acid.

EQUIVALENTS

E, $R_2$, $R_6$ and $R_7$ same as flow sheet I.

REAGENTS (1) Friedel-Crafts reaction using a Lewis Acid catalyst Cf. Organic Reaction, vol. II, p. 130.
(2) Heat with polyphosphoric acid.
(3) Reformatsky Reaction: Zn in inert solvent, heat.
(4) p-Toluene sulfonic acid and $CaCl_2$ or $I_2$ at 200° or $P_2O_5$ and refluxing in benzene.

(II). Preparation of indene acetic acid.

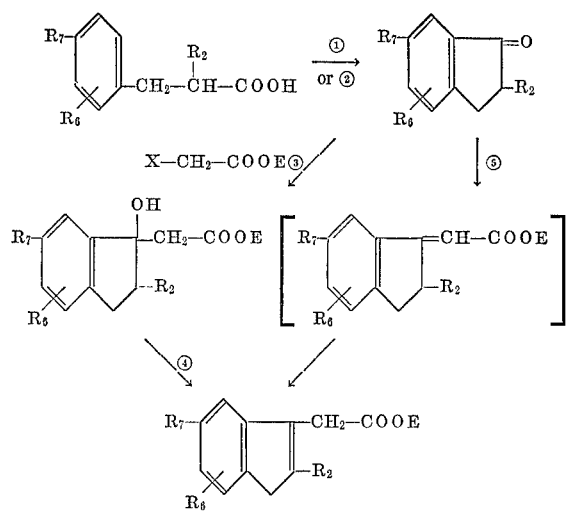

Several routes are possible for the preparation of the 3-indenyl aliphatic amines. The indene acetic acid may be converted to an alcohol or an aldehyde. If the alcohol is formed, it is then acylated in a reaction with an aldehyde or ketone in the presence of a strong base. The acylated indenyl aliphatic alcohol is then reacted with tosyl chloride to form a tosylate which is reacted with the appropriate amine to form the 3-indenyl aliphatic amines of this invention. If the aldehyde is formed, it is hydrogenated to form an alcohol which is converted as described above to form the α-methyl-(3-indenyl)-aliphatic amines. Inasmuch as the starting material for the above preparation of the 3-indenyl aliphatic amines of this invention is an indenyl acetic acid, if it is desired to form indenyl methyl amines or indenyl propyl amines, the number of carbons on the aliphatic side chain must be varied. The 3-indenyl methyl amines of this invention may be prepared by refluxing an indenyl acetic acid with pyridine oxide to form an indenyl formaldehyde and then proceeding as described above to form the corresponding amine. The indenyl propyl amines are prepared by reacting the indenyl alcohol with tosyl chloride and then sodium cyanide to form the nitrile. Refluxing of the nitrile with a strong base and subsequent acidification produces a 3-indenyl propionic acid which is converted to the corresponding amine as described above.

EQUIVALENTS

E, $R_2$, $R_6$ and $R_7$ same as flow sheet I.
$R_3$ may be hydrogen or loweralkyl.
$R_4$ may be acyl or tolylsulfonyl, or together with $R_3$ and the nitrogen to which they are attached, phthalimido.

REAGENTS (1) Heat with lithium aluminum hydride.
(2) Reaction with aldehyde or ketone, using strong base as catalyst, warming if necessary to form the carbanion in solvents such as liquid ammonia, dimethylformamide, 1,2-dimethoxyethane, pyridine, and aqueous alcohol.
(3) Tosyl chloride.
(4) Amine.
(5) React with tosyl chloride to form the tosylate, reflux the tosylate with sodium cyanide to form a nitrile, reflux nitrile with a strong base, and acidify.
(6) Reflux with methyl lithium.
(7) Sodium borohydride.
(8) Reflux with pyridine oxide and acetic anhydride in benzene.

(III). Preparation of 3-indenyl aliphatic amines.

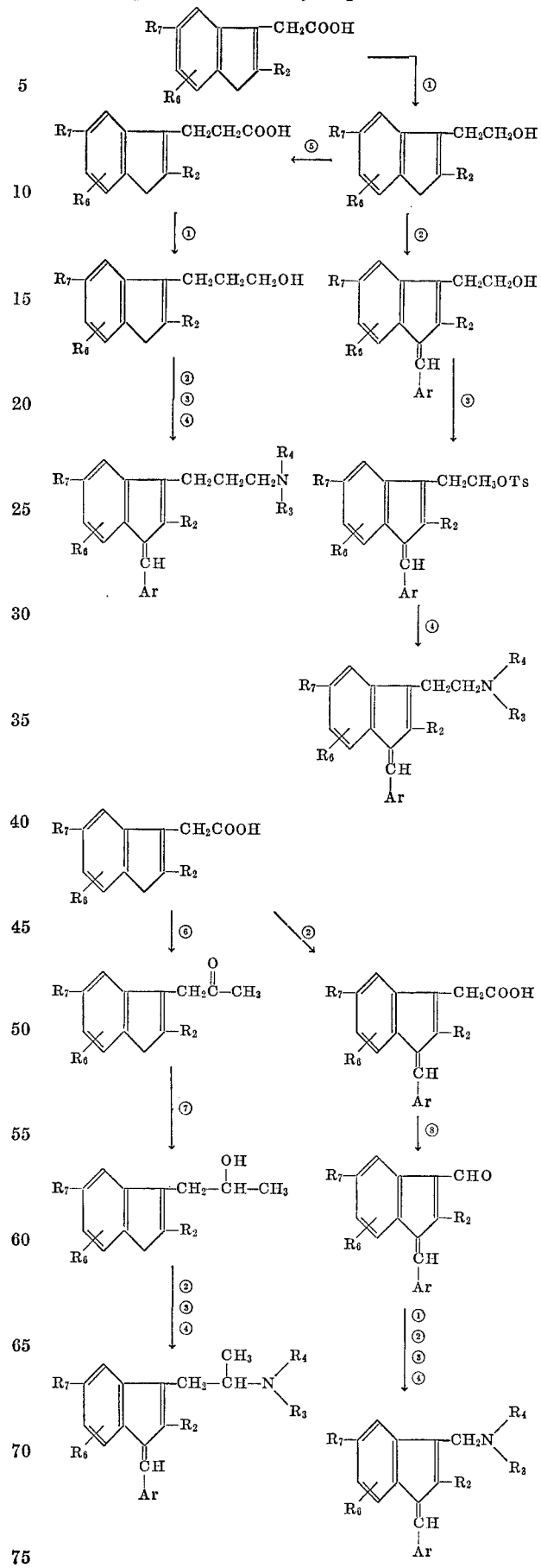

In the introduction of the 1-substituent by either of the methods described in Flow Sheet III, any aryl or heteroaryl aldehyde may be used either directly in the base condensation or in the form of its Wittig reagent in the alternative route. Among the aldehydes which may be used are benzaldehyde and substituted benzaldehydes such as 4-chlorobenzaldehyde,
2-chlorobenzaldehyde,
4-bromobenzaldehyde,
2,4-dichloro or dibromobenzaldehyde,
4-methylthiobenzaldehyde,
4-methyl, ethyl, propyl, i-propyl, butyl or t-butylbenzaldehyde,
4-fluorobenzaldehyde,
4-trifluoromethylbenzaldehyde,
3-trifluoromethylbenzaldehyde,
4-dimethylsulfamylbenzaldehyde,
4-methylsulfamylbenzaldehyde,
2-nitro-4-chlorobenzaldehyde,
2-methoxy-4-dichlorobenzaldehyde,
2-nitro-4-methylbenzaldehyde,
2-nitro-4-fluorobenzaldehyde,
2-nitro-4-methoxybenzaldehyde,
p-anisaldehyde,
salicylaldehyde,
vanillin,
p-terephthalaldehydic acid amines (e.g., the methyl, dimethyl, methylethyl and diethylamides),
pyridine 2,3 and 4-aldehydes,
thiophene 2 or 3-aldehydes,
pyrazine aldehyde,
pyrrol-2-aldehyde,
furfural,
pyrimidine-2-aldehyde,
$\alpha$ and $\beta$-naphthaldehyde,
benzothiazole-2-aldehyde,
3-nitrothiophene-2-aldethyde,
furyl-2-aldehyde,
1-methylpyrrol-2-aldehyde,
thiazole-2-aldehyde,
1-methylpyrazole-5-aldehyde,
oxazole-4-aldehyde,
5-styryl-6-ethoxyoxazole-2-aldehyde,
1-methylpyrridine-4-aldehyde,
2-ethoxypyrane-3-aldehyde,
1-phenylpyridazine-6-aldehyde,
1-methylindole-3-aldehyde,
5-chlorobenzo-3-aldehyde,
thionaphthene-3-aldehyde,
benzofuran-5-aldehyde,
1-methylbenzimidazole-2-aldehyde,
7-aza-indole-3-aldehyde,
3-methylbenzopyrane,
quinoline and 8-aldehydes,
isoquinoline-4-aldehyde,
quinoxaline-2-aldehyde,
naphthyridine-2-aldehyde,
benzoxazole-2-aldehyde, and the like. Substituents on the aromatic rings are preferably in the 4-position.

The methods of preparation of the compounds of the invention given hereinbefore are suitable for the preparation of all the substituted derivatives of such compounds. When a given substitutent is desired at the 2-position, the proper $\alpha$-substituted $\beta$-aryl propionic acid is selected for the indanone condensation. In the same manner, by choosing this acid with the proper substituents on the phenyl radical, the benzenoid portion of the indene nucleus is substituted with the desired groups.

However, in those cases wherein a reduction is required to prepare the starting or intermediate materials, all those groups in the molecule which are susceptible to reduction (such as alkenyls, alkynyls, benzyloxy, nitro, and cyano groups) are either eliminated or protected prior to the reduction step. In those cases where the substituent is an alkenyl or alkynyl group, the corresponding aldehyde or ketone may be used, whereupon, after reduction, the aldehyde or ketone is converted to the alkenyl or alkynyl group by means of a Wittig reaction. In those cases where the group is a benzyloxy or substituted benzyloxy, the corresponding hydroxy or substituted hydroxy may be used, whereupon, after reduction, the benzyloxy substituent may be obtained by benzylating the hydroxy group. In cases wherein the substitutent is the cyano group, the carboxamide group is used in its place, whereupon, after reduction, the carboxamide is dehydrated to the desired cyano substituent. In some cases, it is also possible to reduce the particular compound by a selective reduction, which will not affect certain groups.

The synthesis of various compounds of this invention having a 5-substituent which has a nitrogen attached to the benzenoid ring of the indene is generally based on the 5-nitro compound, which is transformed into the desired 5-substituent. However, due to the reducing conditions necessary for many of the reactions described heretofore in the synthesis of the compounds of the invention, it is necessary to convert the nitro substituent to the desired radical before the propionic acid starting material is condensed to an indanone, unless the reduction of that nitro substituent to the amino radical will not be disadvantageous to further reactions at that position.

The transformation of the nitro group can be carried out in a number of ways, after reduction to the corresponding amine. Thus reaction of the amine with alkyl halides gives mono or dialkylamino groups. If the alkyl halide is a dihaloalkylene group (e.g., 1,4-dibromobutane), a heterocyclic ring (e.g., pyrrolidino) is formed. Similarly, bis-(-chloroethyl) ether will give an N-morpholino compound. Alkylation can also be carried out simultaneous with reduction, as, e.g., with formaldehyde and Raney nickel and hydrogen. Acylation can similarly be carried out on these amino compounds or on the nitro (with simultaneous reduction) to give 5-acylamido compounds. The amino group can be reacted with isocyanates to give 5-ureido compounds.

The salts of the amine compounds of the invention may be prepared in accordance with well-known procedures, as, for example, dissolving the amine in a suitable organic solvent, followed by the addition of the desired acid. For instance, gaseous hydrochloric acid may be bubbled into a solution of the amine to produce the hydrochloride salt as a precipitate. The product is filtered and washed with an organic solvent, suitably a lower alkanol, such as ethanol. It is specifically intended to include those salts which are pharmaceuticaly acceptable within the purview of the invention. Such salts contain a pharmaceutically acceptable anion which is a nontoxic anion of any of the simple acids used therapeutically to neutralize basic medicinal agents when salts thereof are to be utilized therapeutically. These acids include both organic and inorganic acids as for example, in addition to hydrochloric acid mentioned above, hydrobromic, hydriodic, sulfuric, succinic, phosphoric, maleic, tartaric, citric and glycolic acids. But the pharmaceutical activity of the neutral molecule is primarily a function of the cation. The anion serves primarily to supply electrical neutrality.

When $R_4$ and $R_5$ substituents are desired other than hydrogen, the primary amino group of the compounds synthesized may be reacted with the proper organic halide to yield the desired $R_4$ and $R_5$ substituent, as, e.g., when a lower alkyl is desired, the primary amino group may be reacted with a lower alkyl iodide in an inert solvent at slightly elevated temperatures; when an alkyl group is desired, the primary amino group may be reacted with an allyl bromide; or when $R_4$ and $R_5$ are taken together with the nitrogen and the morpholino group is desired, the reaciton may be carried out on the primary amino group using β,β-dichlorodiethyl ester.

This invention can be illustrated by the following non-limiting examples.

EXAMPLE 1

2-methyl-6-methoxyindanone (A) A total of 0.55 mole of zinc dust is placed in a 500 ml. 3-necked flask and a 250 ml. addition funnel attached thereto is charged with a solution containing 80 ml. of anhydrous benzene, 20 ml. of anhydrous ether, 0.58 mole of p-anisaldehyde and 0.55 mole of ethyl-2-bromopropionate. About 10 ml. of the solution is added to the zinc dust with vigorous stirring and the mixture is warmed gently until an exothermic reaction commences. The remaining reactants are added dropwise at such a rate that the reaction mixture is refluxing smoothly on its own accord (ca. 30–35 min.). After addition is completed the mixture is placed in a water bath and refluxed for 30 minutes. After cooling to 0°, 250 ml. of 10% sulfuric acid is added with vigorous stirring. The benzene layer is extracted twice with 50 ml. portions of 5% sulfuric acid and washed twice with 50 ml. portions of water. The aqueous acidic layers are combined and extracted with 2× 50 ml. ether. The combined ethereal and benzene extracts are dried over sodium sulfate. Evaporation of solvent and fractionation of the residue through a 6″ Vigreux column affords 89 g. (69%) of the product, ethyl-2-hydroxy - 2 - (p-methoxyphenyl)-1-methylpropionate, B.P. 165–160° (1.5 mm.).

By the method described in Vander Zanden, Rec. trav. chim. 68, 413 (1949), the above compound is converted to 2-methyl-6-methoxyindanone.

(B) When similar quantities of other aldehydes are employed in the procedure of part A in place of p-anisaldehyde, the corresponding 2-methyl indanones are obtained, for example:

2,6-dimethylindanone
2-methyl-6-hydroxyindanone
2-methyl-6-cyanoindanone
2-methyl-4-methoxy-6-hydroxyindanone
2-methyl-6-methylthioindanone
2-methyl-6-benzyloxyindanone
2-methyl-6-methylsulfonylindanone
2-methyl-6-dimethylsulfonylindanone
2-methyl-6-dimethylaminoethylindanone
2-methyl-6-(p-ethylbenzyloxy)indanone
2-methyl-6-fluoroindanone
2-methyl-6-benzylthioindanone
2-methyl-6-aminoindanone
2-methyl-6-diethylaminoindanone
2-methyl-6-(p-chlorobenzyloxy)indanone
2-methyl-5,6-methylenedioxyindanone
2-methyl-5,6-difluoroindanone
2-methyl-5-fluoro-6-methoxyindanone
2-methyl-4,6-difluoroindanone (C) By replacing the bromopropionate compound in part A with other halo esters, as well as using other aldehydes, indanones substituted or unsubstituted at the 2-position and on the benzenoid ring are obtained, for example:

2-isopropyl-6-methoxyindanone
2-phenyl-6-methylindanone
2-methoxy-4-methylindanone
2-methylthio-6-methylindanone
2-phenylthioindanone
2-allyl-6-methoxyindanone
2-fluoroindanone
2-chloromethyl-6-dimethylsulfamylindanone
2-methylthio-6-phenoxyindanone
2-(p-methoxyphenyl)-6-t-butylindanone
2-trifluoromethyl-6-ethoxyindanone
2-ethyl-6-(4′-methyl-1′-piperazinyl)indanone 2-(prop-2-en)-6-cyano-7-methylindanone
2-(t-butyl)-6-methoxy-7-trifluoromethylindanone
2-bromo-6-(4′-morpholinyl)-7-fluoroindanone
2-(p-methoxyphenyl)-5-chloro-6-methoxyindanone
2,7-dimethy-6-cyclobutylmethyloxyindanone
6-vinylindanone
2-thienyl-6-methoxyindanone
2-benzylindanone (D) Additionally, many indanones are known in the literature and are thus readily available as intermediates for the rest of the synthesis. Among these compounds are:

5-methoxyindanone
6-methoxyindanone
6-methyl-2-benzylindanone
5-methylindanone
5-methyl-6-methoxyindanone
5-methyl-7-chloroindanone
4-methoxy-7-chloroindanone
4-ispropyl-2,7-dimethylindanone
5-nitroindanone
7-nitroindanone
7-phenylindanone
2-phenylindanone
6,7-benzoindanone
5,6,7-trichloroindanone
5-benzyloxyindanone
2-n-butylindanone
5-methylthioindanone
5-methoxy-7-nitroindanone.

EXAMPLE 2

α-Methyl-β-(p-methylthiophenyl)propionic acid

To a solution of 2.3 (0.1 mole) of sodium in 100 ml. of absolute alcohol is added 17.4 g. (0.1 mole) of diethyl methylmalonate and 17.3 g. (0.1 mole) of p-methylthiobenzylchloride. The mixture is heated under reflux in a water bath for three hours. The reaction mixture is poured into water and the aqueous solution is extracted six times with ether and dried. It is then evaporated to yield diethyl methyl-p-methylthiobenzyl malonate. The crude product is then saponified by heating with excess 4% sodium hydroxide in aqueous ethanolic solution. The solution thus formed is concentrated, extracted with ether to remove any neutral material, and acidified with dilute sulfuric acid. The acidic mixture is heated on a steam bath for one hour, cooled and then extracted with ether. Evaporation of the ether solution gives α-methyl-β-(p-methylthiophenyl)propionic acid.

In a similar manner, using other substituted malonic esters in place of diethyl methylmalonate and other substituted benzyl halides in place of p-methylthiobenzyl chloride, the corresponding substituted propionic acids are obtained, for example:

α-allyl-β-(p-nitrophenyl)propionic acid
α-methoxyphenyl-β-(p-ethylthiophenyl)priopionic acid
α-methyl-β-(p-methoxyphenyl)propionic acid.

EXAMPLE 3

2-methyl-6-methoxyindanone

α-Methyl-β-(p-methoxyphenyl) propionic acid (15 g.) is added to 170 g. of polyphosphoric acid at 50° and the mixture is heated at 83–90° for two hours. The syrup is poured into iced water, stirred for one-half hour and then extracted with ether three times. The ethanol solution is washed with water twice and 5% NaHCO₃ five times until all the acidic material has been removed. The remaining neutral solution is washed with water and dried over sodium sulfate. Evaporation of the solution gives 2-methyl-6-methoxyindanone.

In a similar manner, other β-aryl propionic acids may be converted to the corresponding indanone by the procedures of this example. Thus, α-methyl-β-[(3-chloro-4-ethoxy)phenyl] propionic acid, α-fluoro-β-(p-isopropoxyphenyl) propionic acid, α-isopropyl-β-(p-benzyloxyphenyl) propionic acid and α-(prop-2-en)-β-[(2-methyl-4-phenoxy)-phenyl] propionic acid yield 2-methyl-5-chloro-6-ethoxyindanone, 2-fluoro-6-isopropoxyindanone 2-isopropyl-6-benzyloxyindanone and 2-(prop-2-en)-4-methyl-6-phenoxyindanone, respectively.

EXAMPLE 4

2-methyl-6-fluoroindanone (A) Ethyl-4-fluoro-α-methylcinnamate.—Into a dry 1-liter 3-neck round bottom flask equipped with stirrer, thermometer and nitrogen inlet tube is charged sodium hydride (0.384 mole). Ethyl propionate (1.45 moles) is added, the temperature kept at ca. 10° C. with a Dry Ice-acetone bath. Absolute ethanol (0.48 ml.) is then added, followed by a mixture of ethyl-propionate (0.78 mole) and p-fluorobenzaldehyde (0.322 mole) added at such a rate that the temperature stays at 15–20° C. The mixture is cooled to 150°, the Dry Ice-acetone bath replaced by an ice bath, and the mixture stirred one hour. A solution of 29.2 ml. of glacial acetic acid in 108 ml. water is added, the mixture stirred ca. 15 minutes, transferred to a separatory funnel, the layers separated, and the aqueous layer extracted with 2× 54 ml. ether. The ether and organic layers are combined, washed with 2× 36 ml. water and 3× 97 ml. 10% aqueous potassium carbonate solution, dried over anhydrous potassium carbonate, filtered, and the solvent removed in vacuo. Distillation of the oily residue in vacuo gives ethyl-4-fluoro-α-methylcinnamate, B.P. 125–131°; 5–6 mm.

Similarly, the use of o-fluorobenzaldehyde, m-fluorobenzaldehyde and p-trifluoromethylbenzaldehyde in place of p-fluorobenzaldehyde in the above procedures gives ethyl-2-fluoro-α-methylcinnamate, ethyl-3-fluoro-α-methylcinnamate and ethyl-4-trifluoromethyl-α-methylcinnamate, respectively.

(B) 4-fluoro-α-methylcinnamic acid

To a solution of ethyl-4-fluoro-α-methylcinnamate (0.01 mole) in 25 ml. of ethanol is added a solution of potassium hydroxide (0.01 mole) in 5 ml. of water and the mixture stirred overnight at room temperature under a nitrogen atmosphere. Water (ca. 100 ml.) is added, the aqueous mixture washed with 3× 100 ml. ether, ice-cooled and acidified with 2.5 N hydrochloric acid, and extracted with 3× 100 ml. ethyl acetate. The combined ethyl acetate extracts are washed with 2× 100 ml. water, dried over anhydrous sodium sulfate, filtered, and the solvent removed in vacuo leaving 4-fluoro-α-methylcinnamic acid, M.P. 151–153° C. (from ethanol).

Similarly, using ethyl-2-fluoro-α-methylcinnamate, ethyl-3-fluoro-α-methylcinnamate, or ethyl-4-trifluoromethyl-α-methylcinnamate in place of ethyl-4-fluoro-α-methylcinnamate in the above procedure gives 2-fluoro-α-methylcinnamic acid, 3-fluoro-α-methylcinnamic acid and 4-trifluoromethyl-α-methylcinnamic acid, respectively.

(C) 4-fluoro-α-methylhydrocinnamic acid

A solution of 4-fluoro-α-methylcinnamic acid (0.23 mole) in 800 ml. of anhydrous ethanol is reduced at room temperature under a hydrogen pressure of 40 p.s.i. in the presence of 2 g. 5% palladium on carbon. After filtering, the ethanol is removed in vacuo, several 40 ml. portions of benzene added and distilled away to remove moisture, and the oily residue dried in vacuo leaving 4-fluoro-α-methylhydrocinnamic acid.

Similarly, reduction of 2-fluoro-α-methylcinnamic acid, 3-fluoro-α-methylcinnamic acid, and 4-trifluoromethyl-α-methylcinnamic acid using the above procedure gives the corresponding hydrocinnamic acid derivative.

(D) 2-methyl-6-fluoroindanone

The procedure of Example 3 is followed using 4-fluoro-α-methylhydrocinnamic acid in place of the methyl methoxyphenyl propionic acid used there, to yield 2-methyl-6-fluoroindanone.

Similarly, 4-fluoro-2-methylindanone, 5-fluoro-2-methylindanone, 6-trifluoromethyl-2-methylindanone and the other indanone intermediates disclosed herein are obtained via the above procedure (followed by chromatography on an acid-washed alumina column [v./v. 1:30] using ether-petroleum ether [v./v. 0–60%] for the 5-fluoro-2-methylindanone) from 2-fluoro-α-methylhydrocinnamic acid, 3-fluoro-α-methylhydrocinnamic acid, and 4-trifluoromethyl-α-methylhydrocinnamic acid, respectively.

EXAMPLE 5

5-methoxy-2-methylindene-3-acetic acid

A mixture of 6-methoxy-2-methylindanone (0.112 mole), cyanacetic acid (0.123 mole), acetic acid (6.6 g.), and ammonium acetate (1.7 g.) in dry toluene (15.5 moles) is refluxed with stirring for 21 hours, as the liberated water is collected in a Dean Stark trap. The toluene is concentrated and the residue dissolved in 60 ml. of hot TBA and 14 ml. of 2.2 N aqueous potassium hydroxide solution. 22 g. of 85% KOH in 150 ml. of water is added, and the mixture refluxed for 13 hours under $N_2$. The ethanol is removed under vacuum, 500 ml. water added, the aqueous solution washed well with ether and then boiled with charcoal. The aqueous filtrate is acidified to pH 2 with 50% hydrochloric acid, cooled and the precipitate collected yielding 5-methoxy-2-methylindene-3-acetic acid.

Other acids such as 5,6-difluoro-2-methylindene-3-acetic acid, 5-fluoro-2-methylindene-3-acetic acid, 5,7-difluoro-2-methylindene-2-methylindene-3-acetic acid, etc. may be produced according to the above procedure.

EXAMPLE 6

2-methyl-5-methoxy-3-indenethanol

A solution of 5-methoxy-2-methylindene-3-acetic acid (34 g.) (0.156 mole) in 200 ml. of warm, dry tetrahydrofuran is added dropwise with stirring to a stirred slurry of lithium aluminum hydride (6.05 g.) (0.16 mole) in ether (200 ml. )while a slow reflux is maintained. After the addition is completed, the mixture is refluxed for an additional 30 minutes. The reaction mixture is then treated with 6 ml. of water, 6 ml. of 15% NaOH solution and 18 ml. of water before being filtered. The filtrate is dried over magnesium sulfate and evaporated to leave 22.6 g. of 2-methyl-5-methoxy-3-indenethanol, an oil (B.P. 130–138°).

EXAMPLE 7

1-p-chlorobenzylidene-2-methyl-5-methoxy-3-indenethanol

A solution of 2-methyl-5-methoxy-3-indenethanol (1.0 g.) and p-chlorobenzaldehyde (0.7 g.) in 10 ml. of dry pyridine is treated with 5 ml. of Triton B. The reaction mixture is allowed to stand for 12 hours and then is poured into 50 ml. of a 5% $H_2SO_4$ solution. The yellow solid is filtered and recrystallized from ethanol to yield 1.5 g. of 1-p-chyorobenzylidene-2-methyl-5-methoxy-3-indenethanol, M.P. 121–122°.

Other benzaldehydes such as 4-methylthiobenzaldehyde, 4-fluorobenzaldehyde, etc. may be used in the above procedure to preduce the corresponding acylated alcohols. The 1-p-methylsulfinylbenzylidene ethanol compounds may be prepared by oxidizing the corresponding methylthio compounds.

EXAMPLE 8

1-p-chlorobenzylidene-(2-methyl-5-methoxy-3-indenylethyl)-tosylate

To a cooled solution of 1-p-chlorobenzylidene-2-methyl-5-methoxy-3-indene ethanol (0.63 g., 5.0 mmole) in 15 ml. of dry pyridine is added tosyl chloride (0.96 g., 5.0 mmole) in one portion. The mixture is allowed to stand for 10 hours at 10° and then 2 ml. of water is added while the temperature is kept below 10°. After 30 minutes an excess of 5% HCl solution is added and the reaction mixture is extracted twice with chloroform, dried over magnesium sulfate and evaporated under reduced pressure to yield 1.96 g. of oil which crystallizes from ether.

EXAMPLE 9

1-p-chlorobenzylidene-(2-methyl-5-methoxy-3-indenylethyl)-phthalimide 4.8 g. (10 mmole) of (1-p-chlorobenzylidene-2-methyl-5-methoxy-3-indenylethyl)-tosylate is dissolved in 100 ml. of dry N,N-dimethylformamide and 2.0 g. (12 mmole) of potassium phthalimide is added. The mixture is stirred and heated to 95° for 2 hours. After cooling, water is added until precipitation of the yellow solid is complete. Filtration and drying yields 4.0 g. of (1-p-chlorobenzylidene - 2 - methyl - 5 - methoxy - 3 - indenylethyl)- phthalimide, M.P. 180–182°.

The other phthalimides of this invention such as (1-p-methylsulfinylbenzylidene - 2 - methyl - 5,6 - difluoro- 3 - indenylethyl) - phthalimide, (1 - p - methylsulfinylbenzylidene - 2 - methyl - 5 - methoxy - 6 - fluoro - 3- indenylethyl) - phthalimide, (1 - p - methylsulfinylbenzylidene - 2 - methyl - 5 - chloro(or 5 - fluoro) - 3- indenylethyl)phthalimide, etc. may also be prepared by the above process.

EXAMPLE 10

1-p-chlorobenzylidene-2-methyl-5-methoxy-3-indenylethylamine 4.0 g. of (1-p-chlorobenzylidene-2-methyl-5-methoxy-3-indenylethyl)-phthalimide is suspended in 150 ml. of ethanol and 1.29 g. of hydrazine hydrate is added. After refluxing for approximately 20 minutes, a clear yellow solution is obtained. Continued refluxing for 2–3 hours yields a white precipitate. Cool, add H$_2$O and concentrated ammonia and extract the mixture with chloroform, dry over magnesium sulfate and evaporate to leave a yellow oil which is triturated with petroleum ether to yield a pale yellow solid, M.P. 77–80°. This solid is dissolved in ether and anhydrous HCl is passed through until no further precipitation results. Filtration and recrystallization of the solid from ethanol results in 2.3 g. of 1-p-chlorobenzylidene - 2 - methyl - 5 - methoxy - 3 - indenylethylamine, M.P. 270–272°.

EXAMPLE 11

N-1-p-chlorobenzylidene-(2-methyl-5-methoxy-3-indenylethyl)-acetamide 1.4 g. of 1-p-chlorobenzylidene-2-methyl-5-methoxy-3-indenethylamine and 15 ml. of acetic anhydried are heated on a steam bath for 3 hours. The excess anhydride is removed under reduced pressure and the residue is washed with ether and filtered. The product is purified from benzene yielding 1.2 g. of N-(1-p-chlorobenzylidene - 2 - methyl - 5 - methoxy - 3 - indenylethyl) - acetamide, M.P. 183–185°.

The various other acetamides of the instant invention may be prepared by reacting the corresponding amine with acetic anhydride as herein described.

EXAMPLE 12

N-(1-p-chlorobenzylidene-2-methyl-5-methoxy-3-indenylethyl)-p-toluenesulfonamide To a solution of 0.8 g. of 1-p-chlorobenzylidene-2-methyl-5-methoxy-3-indenylethylamine in 10 ml. of pyridine is added 2.5 mmole of tosyl chloride. The mixture is heated on a steam bath for 5 minutes and cooled. Water is added until the reaction mixture is cloudy and the mixture is allowed to stand for several hours. Filtration yields 0.76 g. of N-(1-p-chlorobenzylidene-2-methyl- 5 - methoxy - 3-indenylethyl)-p-toluenesulfonamide, M.P. 212–214°.

EXAMPLE 13

1-[2-methyl-5-methoxy-3-indenyl]-propanone-2

4.36 g. (0.02 mole) of the acid in 35 ml. of dry tetrahydrofuran was stirred while 30 ml. of 2.0 M (0.06 mole) methyl lithium was added dropwise. A precipitate forms initially but soon dissolves. After all the reagent has been added the dark mixture is refluxed for 3 hours. Water is added carefully and then 10% HCl solution. The mixture is then extracted with ether and dry magnesium sulfate. Evaporation gives a semi-solid triturate with ether and filter off 1.5 g. of recovered acid. The filtrate (2.7 g.) is a mixture of acid, alcohols, and product. Chromatograph using methylene chloride to give 1.5 g. of pure ketone as an oil.

EXAMPLE 14

1-(2-methyl-5-methoxy-3-indenyl)-2-propanol 1.4 g. of the above ketone in 2.5 ml. of methanol treated with 0.38 g. of sodium borohydride. After stirring for 30 minutes add water and extract with CH$_2$Cl$_2$ to give 1.1 g. of product as an oil.

EXAMPLE 15

1 - (1-p-chlorobenzylidene - 2 - methyl - 5 - methoxy- 3-indenyl) - 2 - propyl phthalimide is prepared from 1- (2 - methyl - 5 - methoxy - 3 - indenyl) - propanol according to the procedures specified in Examples 7, 8 and 9.

N-(1-p-chlorobenzylidene - 2 - methyl - 5 - methoxy- 3-indenyl) - 2 - propyl acetamide and the other acetamide compounds of the instant invention may be prepared according to the procedures specified in Examples 10 and 11 and N-(1-p-chlorobenzylidene - 2 - methyl - 5 - methoxy - 3 - indenyl) - 2 - propyl toluene sulfonamide as well as the other toluene sulfonamide compounds of this invention may be prepared according to the procedures of Examples 10 and 12.

EXAMPLE 16

5-methoxy-2-methylindene-3-propionic acid 17.2 g. of 2 - methyl - 5 - methoxy - 3 - indenethanol in 175 ml. of pyridine is cooled to 5° and 19.0 g. of tosyl chloride is added. After standing 16 hours, the water is poured off and 34 g. of tosylate is isolated as an oil.

The crude tosylate is refluxed for 3 hours with 25 g. of sodium cyanide in 100 ml. of methanol and 25 ml. of water. The reaction mixture is poured into water and extracted with methylene chloride. Work-up gives 16 g. of oily nitrile. The nitrile is refluxed for 12 hours with 50 ml. of water and 25 g. of NaOH. 100 ml. of water is added and the solution is acidified with HCl, extracted with Cl$_3$Cl$_2$, dried with Mg. SO$_4$, and evaporated to leave 11.5 g. of oil which is dissolved in hot benzene and allowed to cool slowly, yielding 9.5 g. of 5-methoxy-2-methylindene-3-propionic acid, M.P. 79–82°.

EXAMPLE 17

(1-p-chlorobenzylidene - 2 - methyl - 5 - methoxy-3-indenylpropyl)-phthalimide and the other phthalimides of this invention are prepared from the acid according to the procedures specified in Examples 6, 7, 8 and 9.

N-(1-p-chlorobenzylidene - 2 - methyl - 5 - methoxy- 3 - indenylpropyl) - acetamide is prepared according to the procedures specified in Examples 10 and 11 and N-(1-p-chlorobenzylidene - 2 - methyl - 5 - methoxy-3-indenylpropyl)-p-toluenesulfonamide is prepared according to the procedures specified in Examples 10 and 12.

EXAMPLE 18

1-(p-chlorobenzylidene)-5-methoxy-2-methylindene-3-carboxaldehyde

A mixture of 1-(p-chlorobenzylidene) - 5 - methoxy-2 methylinden - 3 - ylacetic acid (3.4 g., 0.01 m.), pyridine oxide (3.8 g., 0.04 m.), acetic anhydride (1.9 ml.), and benzene (40 ml.) is heated at gentle reflux (bath temperature ca. 110° C.) in a nitrogen atmosphere for twenty hours. After cooling, silica gel (7 g.) is added, the benzene and acetic anhydride removed in vacuo on a rotary evaporator, and the solid obtained added to a 250 g. silica column packed with methylene chloride, and the column developed with methylene chloride. Concentration of the eluant containing the desired material (followed by TLC) yields 1.4 g. light orange solid (45%). Trituration of this solid with ether, followed by filtration and soxhletting (ether) of the solid obtained yields the title compound, M.P. 124.2–127.6° C.

EXAMPLE 19

1-(p-chlorobenzylidene)-3-hydroxymethyl-5-methoxy-2-methylindene

To an ice-cooled suspension of 1-(p-chlorobenzylidene) - 5 - methoxy - 2 - methylindene - 3 - carboxaldehyde (3.1 g., 0.01 m.) in anhydrous ethanol (100 ml.) is added sodium borohydride (0.12 g., 0.003+ m.) in ethanol (6 ml.) over ca. three minutes, the mixture stirred cold for one hour, and allowed to warm to room temperature overnight. Water (ca. 2 ml.) is added, the ethanol removed in vacuo, the residue partitioned between chloroform-water, the chloroform layer dried (magnesium sulfate), filtered and concentrated to a yellow oil. Trituration with ether-hexane gives a solid, 1.3 g., M.P. 112.5–115.5°

EXAMPLE 20

(1-p-chlorobenzylidene - 2 - methyl - 5 - methoxy-3-indenylmethyl)-phthalimide is prepared from the alcohol according to the procedure specified in Examples 8 and 9.

N-(1-p-phlorobenzylidene - 2 - methyl - 5 - methoxy-3-indenylmethyl)-acetamide is prepared according to the procedure specified in Examples 10 and 11 and N-(1-p-chlorobenzylidene - 2 - methyl - 5 - methoxy-3-indenylmethyl) - p - toluenesulfonamide is prepared according to the procedure specified in Examples 10 and 12.

What is claimed is:

1. A compound of the formula

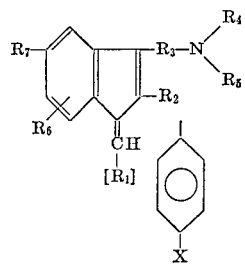

wherein:

$X$ is halogen, haloloweralkyl, loweralkyl or loweralkylsulfinyl;

$R_2$ may be hydrogen or loweralkyl;

$R_3$ may be hydrogen or loweralkyl;

$R_4$ may be acetyl or tolylsulfonyl, or together with $R_3$ and the nitrogen to which they are attached, phthalimido;

$R_5$ is loweralkyl;

$R_6$ may be hydrogen, halogen or trifluoromethyl; and $R_7$ may be hydrogen, halogen, loweralkoxy or diloweralkylamino.

2. (1 - p - chlorobenzylidene - 2 - methyl - 5 - methoxy-3-indenylethyl)-phthalimide.

References Cited

UNITED STATES PATENTS 3,312,730   4/1967   Winter et al. _____ 260—473

JOHN D. RANDOLPH, Primary Examiner

U.S. Cl. X.R.

424—274, 320, 321; 260—247.7 E, 326 A, 326 S, 340.5, 456 R, 465 E, 515 R, 515 M, 516, 517, 556 AR, 562 R, 562 S, 590, 618 F

UNITED STATES PATENT OFFICE
CERTIFICATE OF CORRECTION

Patent No. 3,642,785          Dated    February 15, 1972

Inventor(s) Tsung-Ying Shen, Richard B. Greenwald

It is certified that error appears in the above-identified patent and that said Letters Patent are hereby corrected as shown below:

In Column 16, Claim 1, the structural formula should read:

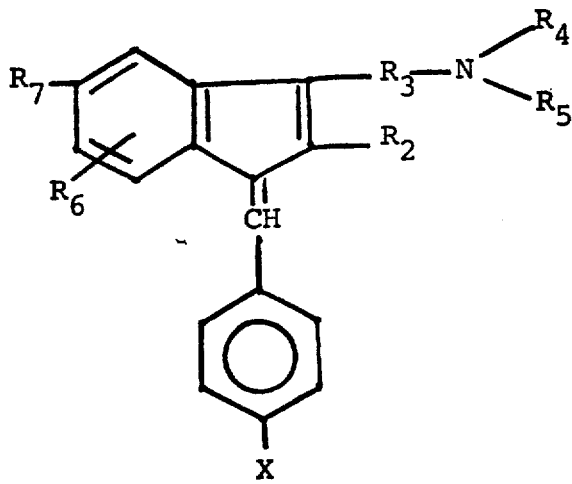

Signed and sealed this 26th day of September 1972.

(SEAL)
Attest:

EDWARD M. FLETCHER, JR.           ROBERT GOTTSCHALK
Attesting Officer                 Commissioner of Patents